United States Patent [19]
Leftin

[11] Patent Number: 6,083,469
[45] Date of Patent: Jul. 4, 2000

[54] PYROLYSIS PROCESS FOR MAKING FULLERENES

[76] Inventor: Harry Paul Leftin, 7360 NW. 18th St. #204, Margate, Fla. 33063-6868

[21] Appl. No.: 09/058,453

[22] Filed: Apr. 10, 1998

[51] Int. Cl.[7] .................................................. C01B 31/02
[52] U.S. Cl. ................................. 423/445 B; 423/445 R; 585/636
[58] Field of Search ........................... 423/445 B, 445 R; 585/636

[56] References Cited

U.S. PATENT DOCUMENTS

| | | | |
|---|---|---|---|
| 5,227,038 | 7/1993 | Smalley | 423/445 B |
| 5,259,856 | 11/1993 | Ohga | 65/900 |
| 5,395,496 | 3/1995 | Tsantrizos | 423/445 B |
| 5,876,684 | 3/1999 | Withers | 423/445 R |

FOREIGN PATENT DOCUMENTS

95/06001  3/1995  WIPO .

OTHER PUBLICATIONS

Holland, L.R. "Continuous Production of Fullerenes by Pyrolysis of Acetylene at a Glassy Carbon Surface", Carbon, vol. 36, #12, pp. 1725–1727, Dec. 1998.

Vogtle, F. "Fullerenes by Pyrolysis of Hydrocarbons . . . " Tetrahedron, vol. 52, #14, pp. 4949–4962, 1996.

*Primary Examiner*—Steven P. Griffin
*Assistant Examiner*—Peter DiMauro

[57] ABSTRACT

Solid fullerite, comprising a mixture of $C_{60}$ and $C_{70}$ fullerenes and higher molecular weight carbon nanotropes, is produced by high temperature, short residence time, pyrolysis of a mixture of hydrocarbons, containing at least two "but less than six" carbon atoms in their molecular structures, admixed with an inert gas comprising at least one member of the Group VIII-A elements of The Periodic Table of The Elements in a substantially reduced-metals free reactor comprised of a thermally stable ceramic or pyrolytic graphite.

8 Claims, No Drawings

PYROLYSIS PROCESS FOR MAKING FULLERENES

This invention relates to a process for large scale, low cost production of solid fullerite, comprising a mixture whose predominant components are $C_{60}$ and $C_{70}$ fullerenes and lesser components comprise a mixture of higher molecular weight carbon nanotropes, by pyrolysis of hydrocarbons. More particularly, the present invention relates to a novel method for the production of fullerite, as essentially the only non-gaseous product of pyrolysis of hydrocarbons, employing a unique combination of operating conditions.

At the present time, soots containing small amounts of fullerenes are produced by the vaporization of graphite using the method first described by Kratschmer, et. al. in Nature (London) Volume 37, pp 354–358, 1990 which involves vaporization of graphite by resistive heating in a helium atmosphere. Attempts to scale up this method have not as yet proven successful. Variations of the Kratschmer method employing carbon arcs to vaporize the graphite have shown limited promise using small diameter graphite rods. Attempts at increasing yields or production rates by using larger diameter rods have been without success. In this respect, Smalley in U.S. Pat. No. 5,556,517 (Sep. 17, 1996) has found that the intense ultraviolet radiation attendant to the use of an arc causes photochemical degradation of fullerenes resulting in decreased yields. In the aforementioned U.S. Patent, Smalley reports the production of small amounts of fullerenes employing a solar furnace to evaporate the graphite and further, in order to mitigate the adverse effects of intense ultraviolet radiation, provides a means for the transport of the carbon vapor species, that are the precursors to fullerenes formation, into a dark zone before the fullerenes have begun to form.

All of the prior art methods for production of fullerenes, using vaporization of graphite to provide the gaseous carbon precursors, produce carbonaceous soots containing only minor amounts of fullerenes, usually less that 10% yield based on carbon vaporized, and require laborious isolation and recovery procedures in addition to elaborate safety precautions due to the carcinogenic properties of these soots. Additionally, these methods suffer from low energy efficiency as at least 90% of the energy expended in vaporization of graphite produces only undesirable and essentially useless carbon soots rather than the desired fullerene products. As a consequence of small scale operations, small fullerene yields, the need for laborious product isolation and recovery techniques and low energy efficiency, fullerenes at this time are very high priced materials, usually selling for hundreds of dollars per gram. Due to the high cost of fullerenes, practical applications have not yet developed even though a vast amount of research on the chemical and physical properties of these materials strongly suggest that under more favorable economics many valuable applications should be feasible. A discussion of properties, production and potential applications of fullerenes may be found in American Chemical Society Symposium Series No. 481 (1992).

Pyrolysis of hydrocarbons to produce olefins, aromatics and other valuable products is very well known. Carbon is always one of the products of hydrocarbon pyrolysis and its formation is highly undesirable as it occurs primarily on the interior surfaces of the tubular reactors and results in a decrease in process efficiency. At least two types of carbon are produced during the pyrolysis of hydrocarbons. These are: (a) filamentous carbon produced at the interior surface of metals-containing reactor walls by a catalytic process and (b) amorphous carbon formed on the interior surface of the reactor walls by condensation and polymerization of adsorbed heavier hydrocarbons. A discussion of coking mechanisms on metal surfaces at elevated temperatures may be found in Catalysis Reviews-Science and Engineering, Volume 16, No. 2, pp 173–180 (1977). As of this time no one has reported significant, if any, fullerene formation or recovery from cokes that were formed during the pyrolysis Of hydrocarbons.

I have now found that significant amounts of fullerenes can be obtained from the pyrolysis of hydrocarbons having at least two carbon atoms wherein the pyrolysis is carried out in an inert (reduced-metals free) reactor, such as fused aluminum oxide, in the presence of an inert diluent such as helium. In one embodiment of the invention, a hydrocarbon such as ethane in admixture with a mono atomic inert gas diluent such a helium is heated by passage through a tubular reactor comprised of fused alumina contained in a heated furnace wherein the maximum temperature within the effective reaction zone is at least 1100° C. and the residence time of the reactant gas mixture in the effective reaction zone is at least 0.001 seconds and the effluent from the effective reaction zone is rapidly cooled. Products resulting from the invention comprise the expected gaseous products from the thermal decomposition of ethane, namely; hydrogen, methane, ethane, ethene and ethyne in addition to a solid product comprised substantially of a mixture of $C_{60}$, $C_{70}$ fullerenes and smaller amounts of higher molecular weight carbon nanotropes.

The process of this invention has four areas of advantage as compared to the prior art. First, it is possible, by proper choice of conditions, to produce essentially pure fullerite(a mixture of fullerenes and other carbon nanotropes) without the large amounts of non-fullerite soots attendant to the production from graphite evaporation, as is the current practice, and thereby greatly simplify the procedure for fullerite recovery. Secondly, the gaseous products of the process of this invention are valuable and can be combined with the effluents from a commercial steam pyrolysis process for the production of olefins, or it can be recycled to the process of this invention following substantial removal of product hydrogen and methane and with the addition of ethane. Thirdly, energy consumption is significantly lower in the process of this invention than in the prior art processes since the temperature required for pyrolysis is much lower that the 4000° C. required for graphite evaporation, and substantially pure fullerite is produced in addition to valuable gaseous products. Fourthly, the process of the invention can be operated in a continuous manner to provide for the production of large quantities of fullerite at lower production cost.

While it is not intended in any way to limit the advantages of the invention to a theory, one explanation of the surprising effectiveness of the use of a ceramic, or other inert material, reactor lies in the avoidance of contact of the heated pyrolysis feed and products with catalytically active reduced-metals, particularly iron and nickel, typically present in the high temperature alloys used in conventional hydrocarbon pyrolysis processes. These metals, as well as other metals of Group VIII-B of The Periodic Table of The Elements, are well known to promote the deposition of carbonaceous materials, generally in the form of the aforementioned cokes, on the interior walls of the tubes in fired tubular furnaces. It is well known that these coke deposits do not contain fullerite.

Again, while it is not intended in any way to limit the advantages of the invention to a theory, one explanation of the surprising effectiveness of helium, or other inert gas, as diluent may be that in the presence of an inert gas the carbon species formed in the gas phase during the high temperature decomposition of the hydrocarbon feedstock can survive for a time sufficient for the self-assembly reaction to produce fullerite to be completed. In commercial pyrolysis, to produce olefins, steam is the preferred diluent and any gas phase carbon species that are formed are rapidly converted to carbon oxides by the well known steam/carbon reaction.

The process of the invention comprises heating a mixture of hydrocarbons, containing at least two carbon atoms in their molecular structure, and a mono atomic inert gas diluent in a reaction zone that is free of reduced metals, particularly those of Group VIII-B of the Periodic Table of the Elements, wherein the maximum temperature within the effective reaction zone is greater than 1100° C. and the residence time within the effective reaction zone is greater than 0.001 second and less than about 0.05 seconds; withdrawing the effluent from said reaction zone and at the point of withdrawal cooling the effluent to a temperature of 700° C. or less; lower temperatures are operable and desirable; causing the cooled effluent to pass through a cyclone separator to effectively separate and recover the fullerite product. Additional separation means, such as bag filters and electrostatic precipitators, may be beneficial for the complete recovery of the fullerite product. Since the feed gas is being heated and cracked during its passage through the effective reaction zone, the temperature of the gas reaches a maximum temperature prior to the quench. It is this maximum temperature which characterizes the reaction. Maximum temperatures within the reaction zone between 1100° C. and 2000° C. are generally preferred while a carefully controlled maximum temperature between about 1500° C. and 2000° C. is operable and desirable.

It is critically important that the reactant gases within the heated effective reaction zone avoid contact with surfaces containing reduced metals such as iron, nickel and other Group VIII-B metals which are known to promote the deposition of carbonaceous materials by reaction with hydrocarbons at elevated temperatures. In the invention the required condition is effected by utilization of reactors whose surfaces are comprised entirely of reduced-metals free ceramic materials such as fused aluminum oxide. However, the invention is not limited in any way to the use of fused aluminum oxide as reactor material; any thermally stable, reduced-metals free, ceramic or other materials can be employed as a reactor material within the scope of the invention; including but in no way limited to such materials as stabilized zirconium oxide, mullite, silicon carbide and pyrolytic graphite.

The residence time during which the process gas stream is contained within the effective reaction zone is stated as:

$$\Theta = V_r/F$$

where $\Theta$=residence time in the effective reaction zone, seconds.

$V_r$=reactor volume in the effective reaction zone, $cm^3$; wherein the effective reaction zone is defined as that portion of the reactor length at which the reactor temperature falls between 700° C. and the aforementioned maximum reactor temperature.

F=flow rate of gases through the effective reaction zone, $cm^3$/second, calculated at the average temperature within the effective reaction zone.

For purposes of this application, including the claims, the foregoing formula for residence time is the definition for the effective residence time of the reaction; the effective reactor volume is calculated from that point at which the reactant gases first reach a temperature of 700° C. at the inlet side of the temperature maximum to that point at which the temperature drops to 700° C. at the outlet side of said temperature maximum; flow rate of gases within the effective reaction volume is calculated at the average temperature within the effective reactor volume using the ideal gas laws, further correction due to the volume increase attendant to the cracking of the hydrocarbon portion of the feed gas was not applied as a substantial portion of the reaction gas mixture comprises the inert gas diluent.

In the effective reaction zone as defined above the range of residence times over which the invention is applicable is 0.001 second to about 0.05 second. The upper limit is emphasized as being very important since excessive exposure of the pyrolysis products at the relatively high temperatures in the effective reaction zone will result in undesirable degradation of fullerite and fullerite precursors to produce coke and products other than fullerite.

It will be evident from the relatively short time afforded the reacting gases at the temperatures within the effective reaction zone that subsequent cooling of the product gases involves rapid quenching commensurate with the abbreviated residence time in the reaction zone. Such rapid quenching can be achieved by injection of cold gas into the reactor effluent. It is, of course, preferred that the gas admixed with the hot effluent stream be of such composition that it not contaminate the products with gases that are difficult to remove nor that it react adversely with the fullerite product and would thus negate certain advantages of the invention. In this regard, it will be evident that quenching by injection of a large volume of cooled product gas will achieve the desired results. At the high velocity thus attained, the combined reactor effluent and quench gas stream may be passed through a cyclone separator to effect an efficient initial separation and recovery of solid fullerite from the process effluent.

Pressure within the reaction zone is essentially atmospheric, although a higher pressure up to 5 atmospheres may be employed as a convenient pressure in commercial recovery operations.

Ethane is a preferred hydrocarbon feed to the reactor for production of fullerite, this may also be admixed with various proportions of its dehydrogenated products of pyrolysis. Other hydrocarbons that may also be used in the invention include, but is not limited to, propane, butanes and pentanes. The aforementioned feed hydrocarbons for the production of fullerite in the invention need not be pure; commercial sources from natural gas and petroleum processing contain small amounts of other hydrocarbons which are not detrimental. However, large amounts of higher molecular weight hydrocarbons should be avoided as they tend to undergo polymerization and condensation reactions to produce coke and coke deposits which are undesirable and obviate some of the advantages of the invention. Small amounts of gases such as hydrogen and methane may also be present in the feed gas for the production of fullerite. Large amounts of hydrogen should be avoided as this material inhibits the formation of the gaseous carbon species that serve as precursors in the self assembly of carbon to produce fullerite. Under the aforementioned conditions for operation of the invention, methane is less efficient for the production of fullerite precursors and large amounts of methane in the feed to the reactor results in undesirable degradation of fullerite yields.

As mentioned previously the hydrocarbon feed and diluent to the reactor must be essentially free of reactive gases, particularly those containing oxygen atoms in their molecular structure such as, for example, oxygen, carbon monoxide, carbon dioxide and water as these are known to destroy the fullerite precursors. Helium is a preferred diluent for the inlet feed to the invention; other inert, mono atomic diluents such as argon can also be employed. The molar ratio of hydrocarbon to inert diluent in the feed can be in the range between about 1% hydrocarbon to about 99% hydrocarbon. The preferred ratio of hydrocarbon to inert diluent is in the range from about 10% hydrocarbon to about 90% hydrocarbon and a more preferred ratio is in the range from about 20% hydrocarbon to about 80% hydrocarbon.

The arrangement used in the practice of the invention on the laboratory scale is similar to that described in U.S. Pat. No. 3,156,734 Nov. 10, 1964, modified by the installation of a cyclone separator in the quench gas recycle loop at a point in the product effluent line between the quench gas mixing zone and the inlet to the quench gas recycle pump. A carefully metered ethane feed, suitably diluted by admixture with chromatography grade helium, is preheated to 550° C. and caused to pass through a heated reactor comprising the annular space between a fused alumina reactor tube and a coaxially disposed fused alumina thermocouple protection tube. This reactor assembly is heated in an electrically powered furnace to provide a reaction zone temperature profile that is substantially symmetrical around a temperature maximum, within the aforementioned range of maximum temperatures, wherein said temperature profile is measured along the length of the reactor assembly using a platinum/platinum-10% rhodium thermocouple. Flow rates of the hydrocarbon/helium mixture are adjusted to provide an effective residence time in the effective reaction zone within the aforementioned range. Hydrocarbon containing feed gas passes through the length of the reactor and the reaction effluent is rapidly quenched by admixture with cooled product gas under conditions described herein above. The total gas effluent is caused to pass through a cyclone separator, sampled for analysis and vented after its volume is measured with a wet test meter. Gaseous products observed include hydrogen, methane, ethane, ethene and ethyne. A reddish-brown powdery solid is recovered from the cyclone separator. Elemental analysis of this solid product indicates that it contains 99.4 weight percent carbon and a trace of hydrogen. Following drying at 120° C. in a vacuum oven, elemental analysis showed 99.9 weight percent carbon, indicating that in the earlier analysis the solid product was contaminated with a small amount of adsorbed or occluded hydrocarbon. This material was found to be essentially completely soluble in toluene and upon filtration through a fine porosity sintered glass funnel only a dark brown stain remained on the surface of the glass frit. The filtered toluene solution of the solid product exhibits strong sharp spectral absorption bands at 330 nm and 380 nm in addition to a weaker, broad absorption centered at about 470 nm. This ultraviolet/visible spectrum is characteristic of fullerites comprised of $C_{60}$ and $C_{70}$ fullerenes admixed with higher molecular weight carbon nanotropes. The aforementioned criteria; elemental analysis, toluene solubility and U.V./Vis spectra are sufficient to characterize the reddish-brown solid product of the invention as being a fullerite comprised of $C_{60}$ and $C_{70}$ fullerenes as major components in addition to higher molecular weight carbon nanotropes as minor components.

There are three features of this experimental laboratory practice of the invention that provides fullerite as essentially the only non-gaseous product, which differentiates it from normal hydrocarbon pyrolysis practice that provides only the typical pyrolysis coke forms and no fullerite. These are: (A) the absence of catalytically active metal sites in the effective reaction zone, particularly the metals of the Group VIII-B elements of the Periodic Table of the Elements, by use of a ceramic (fused alumina) reactor, (B) the absence of chemically reactive diluents, such as steam, from the effective reaction zone by use of a mono atomic inert gas such as helium as diluent and (C) use of very high temperatures and short residence times in the effective reaction zone which leads to the formation of substantial amounts of fullerite precursor vapor phase carbon fragments followed by rapid quenching in a cooled dark zone that facilitates the formation of the desired cluster compounds. In regards to the third of the aforementioned factors, temperatures employed in normal hydrocarbon pyrolysis processes are limited to about 1000° C. or less in order to minimize formation of ethyne which must be thoroughly removed from the ethene product as ethyne adversely effects the catalysts used for ethene polymerization.

It will be evident, that suitable systems and reactors may be employed for the practice of the invention so long as they provide for adequate heat transfer rates into the gaseous feed and adequate quenching of the effluent gases from the effective reaction zone. Suitable devices include but are not limited to those in which the reaction zone is comprised of: the space between narrow heated channels of high temperature refractories; the space between heated rods of carbon or high temperature refractories; the space within a heated ceramic or graphite tube; the space within a ceramic or graphite tube which is longitudinally and coaxially disposed as a liner within a larger diameter tube comprised of a high temperature alloy; as well as the type of annulus reactor configuration employed in the present description of the invention. In all cases, the reactor device must provide a reaction zone which is essentially free of catalytically active reduced metals particularly those of the Group VIII-B elements of the Periodic Table of the Elements.

The following examples illustrate the present invention.

EXAMPLE I

A mixture containing 22 mole % C.P. ethane and 78 mole % chromatographic grade helium was preheated to about 550° C. and passed into a reactor comprising the annular space between a 0.635 cm. I.D. fused alumina reactor tube and a coaxially disposed thermocouple protection tube of 0.508 cm. O.D. fused alumina. This reactor assembly was electrically heated in a furnace device similar to that described in U.S. Pat. No. 3,156,734 to impose a reactor temperature profile which was essentially symmetrical around a maximum temperature of 1180° C. as measured with a traversing coaxially disposed platinum/platinum-10% rhodium thermocouple. Flow rate of the feed gas mixture was such that the effective residence time in the effective reaction zone was 0.0031 seconds. Reactor pressure was essentially isobaric at one atmosphere. After rapid quenching by admixture with a large volume of cooled product gas, the reactor effluent was passed through a cyclone separator, sampled for analysis by gas chromatography and vented after its volume was determined using a wet test gas meter.

After a one hour run under these condition a total of 0.88 grams (1.43 weight % basis hydrocarbon fed) of a reddish-brown powdery solid was recovered from the cyclone separator. This material was shown to be fullerite comprising $C_{60}$ and $C_{70}$ fullerenes and other higher molecular weight carbon nanotropes by elemental analysis, toluene solubility and U.V./Vis spectroscopy. The effluent gas has the following analysis(mole percent on diluent free basis)

| | |
|---|---|
| Hydrogen | 40.64 |
| Methane | 8.62 |
| Ethyne | 4.00 |
| Ethene | 36.20 |
| Ethane | 8.58 |

EXAMPLE II

This experiment is conducted under the same conditions as in Example I except that the maximum temperature is 1340° C. and the effective residence time is 0.0037 seconds. After a one hour run a total of 2.74 grams (4.82 weight % basis hydrocarbon in feed) of redish-brown powder was recovered from the cyclone separator and was characterized as being fullerite comprising $C_{60}$ and $C_{70}$ fullenes in addition to higher molecular weight carbon nanotropes as described herein above. The effluent gas has the following analysis (mole percent, diluent free basis)

| | |
|---|---|
| Hydrogen | 46.45 |
| Methane | 14.75 |
| Ethyne | 5.48 |
| Ethene | 32.72 |
| Ethane | 0.63 |

I claim:

1. A process for the production of a mixture of $C_{60}$, $C_{70}$ fullerenes and higher molecular weight fullerenes, as essentially the only non-gaseous product of the process, comprising:

a) heating, to a temperature between about 1100° C. and about 2000° C. in a substantially reduced-metals free reactor vessel, a feed mixture comprised of a hydrocarbon portion admixed with a diluent portion wherein the diluent portion comprises at least one member of the Group VIII-A elements of the Periodic Table of the Elements and wherein the hydrocarbon portion comprises a mixture containing about 80 to about 100 mole percent of ethane admixed with other aliphatic hydrocarbons having at least two but less than six carbon atoms in their molecular structure;

b) causing the feed mixture at a pressure at least 1 kg/cm$^2$ to flow through the substantially reduced-metals free reactor vessel, contained within and heated by a fired furnace, at a flow rate sufficient to provide a residence time at temperatures greater than 700° C. of between about 0.001 second and about 0.05 second, c) quenching the reactor effluent stream by cooling to a temperature below about 700° C. within a time period about equal to that of its residence time in the reactor by quenching means, wherein the reactor effluent prior to and during the quench procedure is precluded from contact with cooling surfaces comprised of or containing reduced-metals of the Group VIII-B elements of the Periodic Table of the Elements, d) separation and recovery of a solid mixture of fullerenes entrained within the quenched reactor effluent stream by one or more gas/solids separation means.

2. The process according to claim 1 wherein the feed mixture comprises substantially pure ethane admixed with inert gas diluent wherein the proportion of ethane to inert gas is in the range of 1:20 to 20:1 mole ratio.

3. The process according to claim 1, wherein the hydrocarbon portion of the feed comprises a mixture of substantially pure ethane and quenched reactor effluent from which the entrained solid fullerenes have been removed.

4. The process according to claim 1 or claim 2 wherein the reduced-metals free reactor vessel comprises a thermally stable ceramic.

5. The process according to claim 1 or claim 2 wherein the quenched reactor effluent, after separation from the solid mixture of fullerenes, is blended into a reactor effluent stream of a steam/hydrocarbon pyrolysis plant and subjected to the product recovery and separation train of the pyrolysis plant in order to recover ethylene contained therein.

6. The process of claim 1 wherein the quenching means is selected from the group consisting of: indirect heat exchange of the reactor effluent stream in a tube and shell heat exchanger; and admixture of the reactor effluent stream with at least an equal volume of previously quenched reactor effluent cooled to a temperature of less than about 100° C.

7. The process of claim 1 wherein the gas/solids separation means is selected from the group consisting of cyclone separators, filter separators, and electrostatic separators.

8. The process of claim 4 wherein the thermally stable ceramic comprises pure fused alumina, fused stabilized zirconia, or fused mullite.

* * * * *